A. J. HENIG AND J. E. TITUS.
ROTARY ENGINE.
APPLICATION FILED MAY 26, 1917.
1,332,468.
Patented Mar. 2, 1920.
10 SHEETS—SHEET 6.
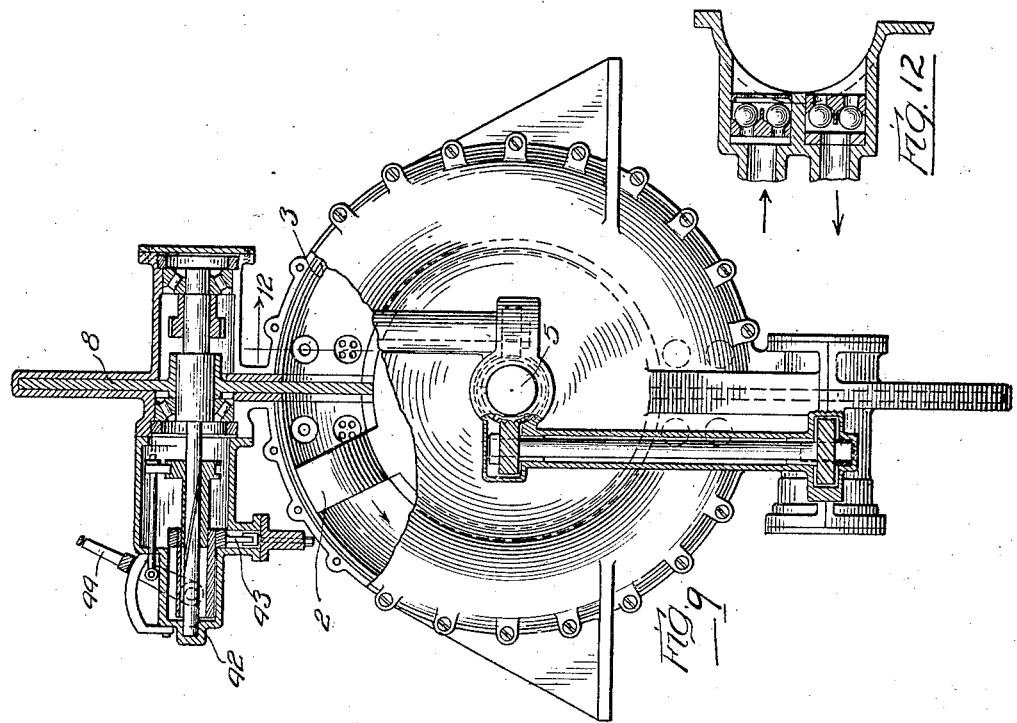
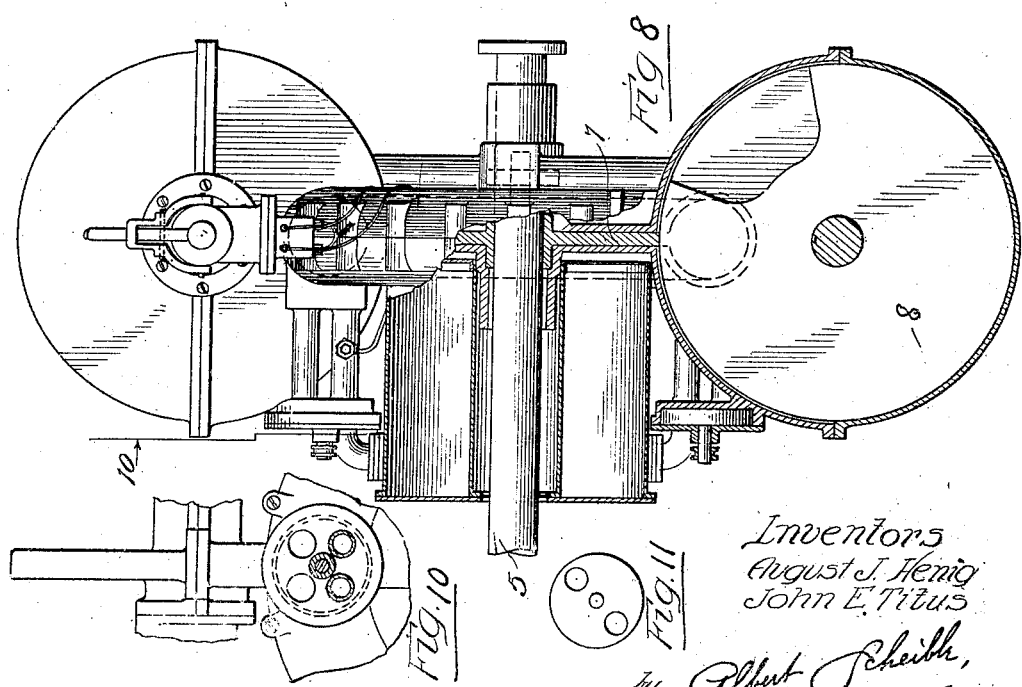
Inventors
August J. Henig
John E. Titus
by Albert Scheibl,
their Atty

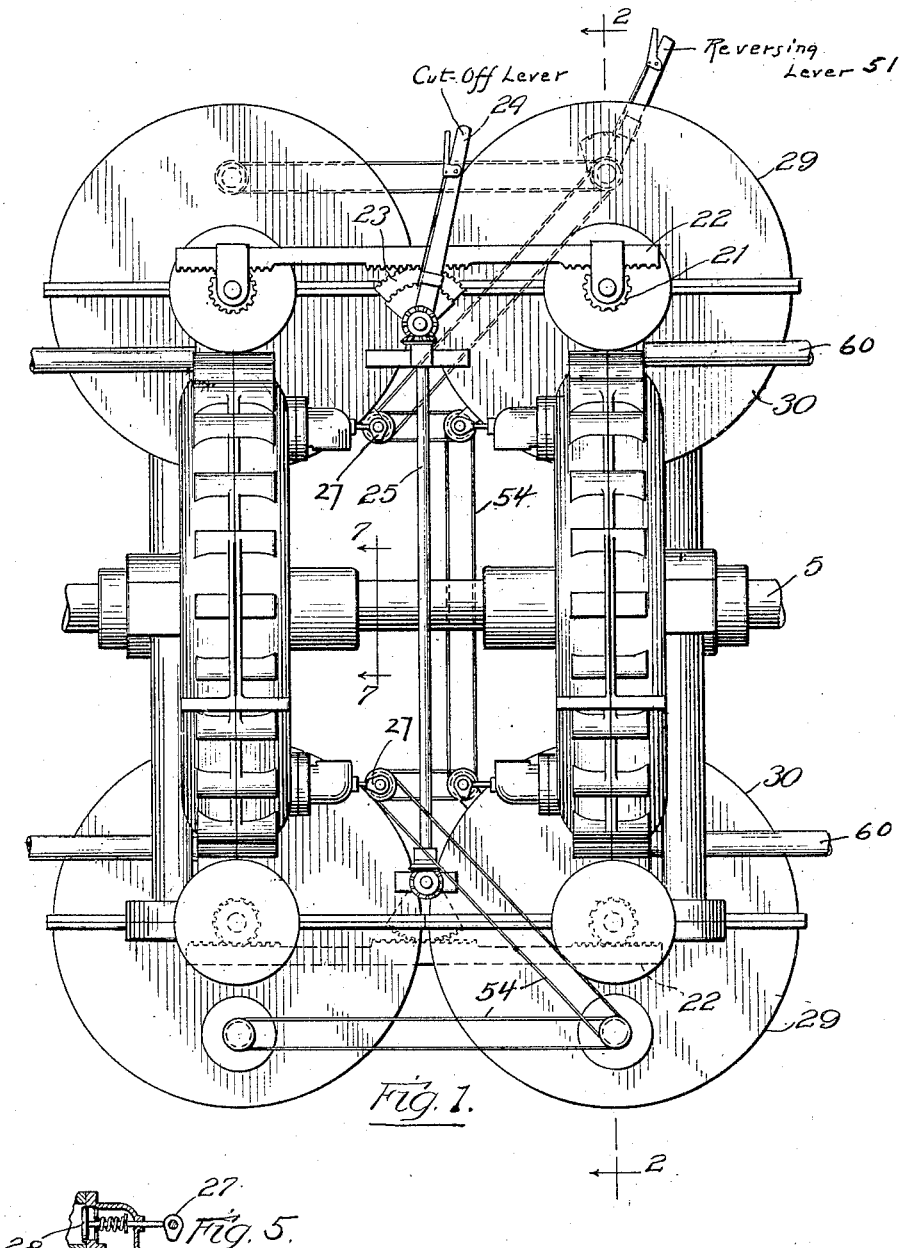

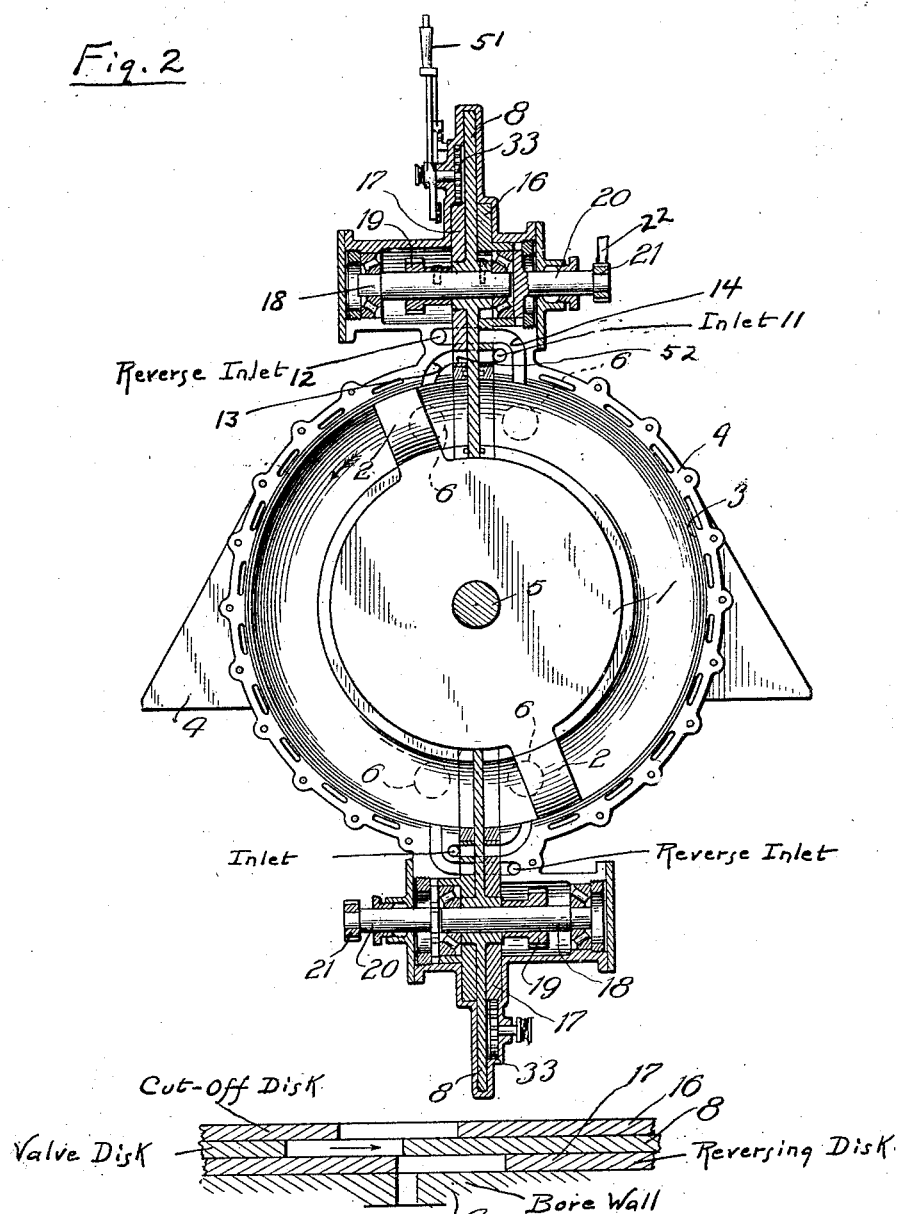

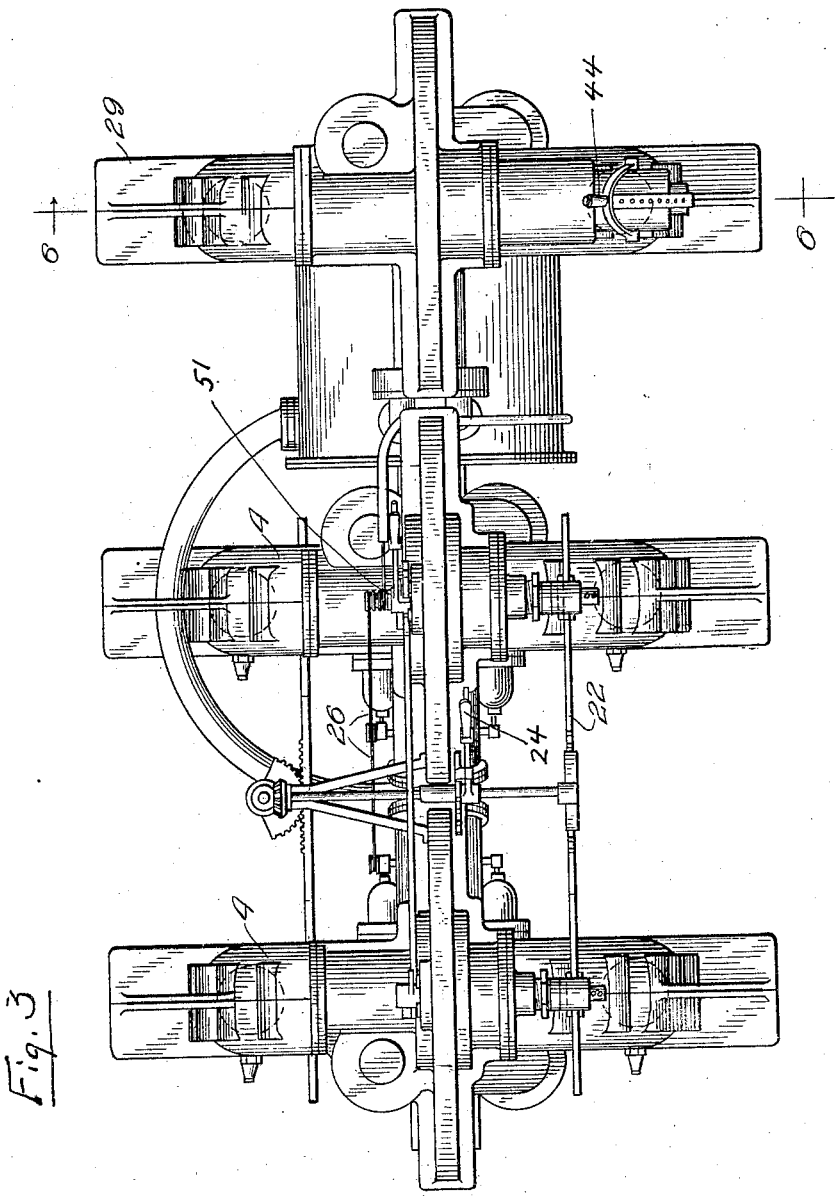

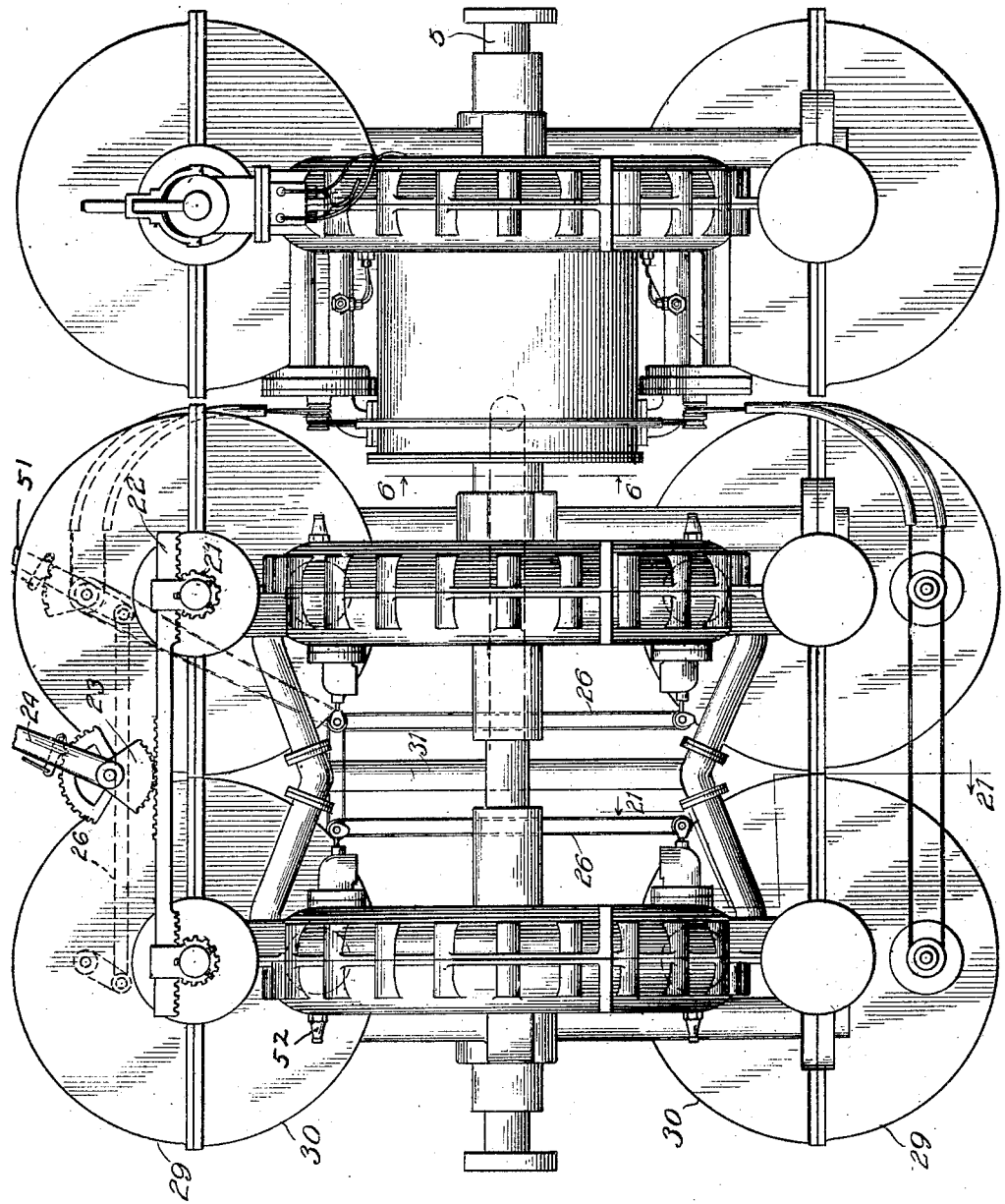

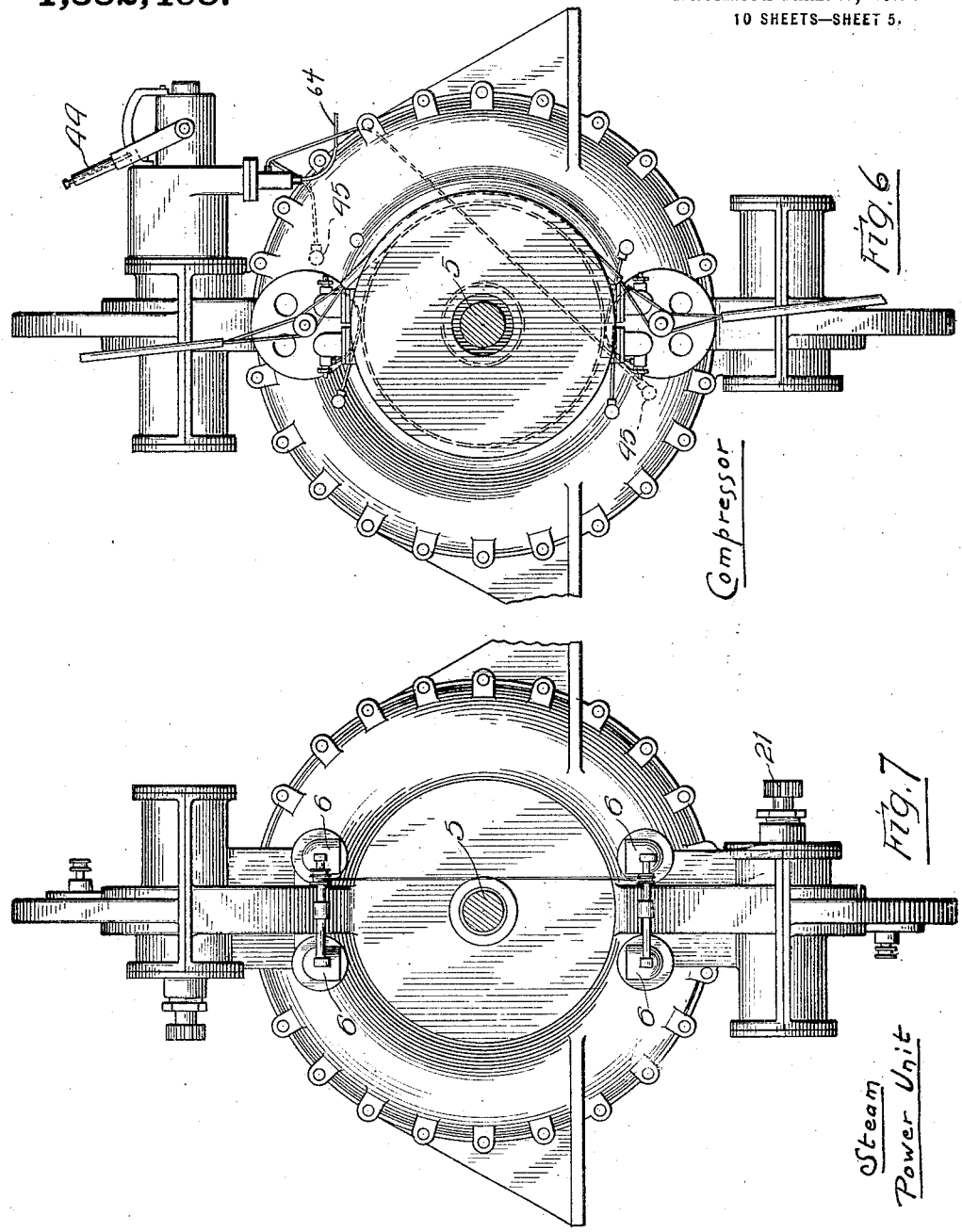

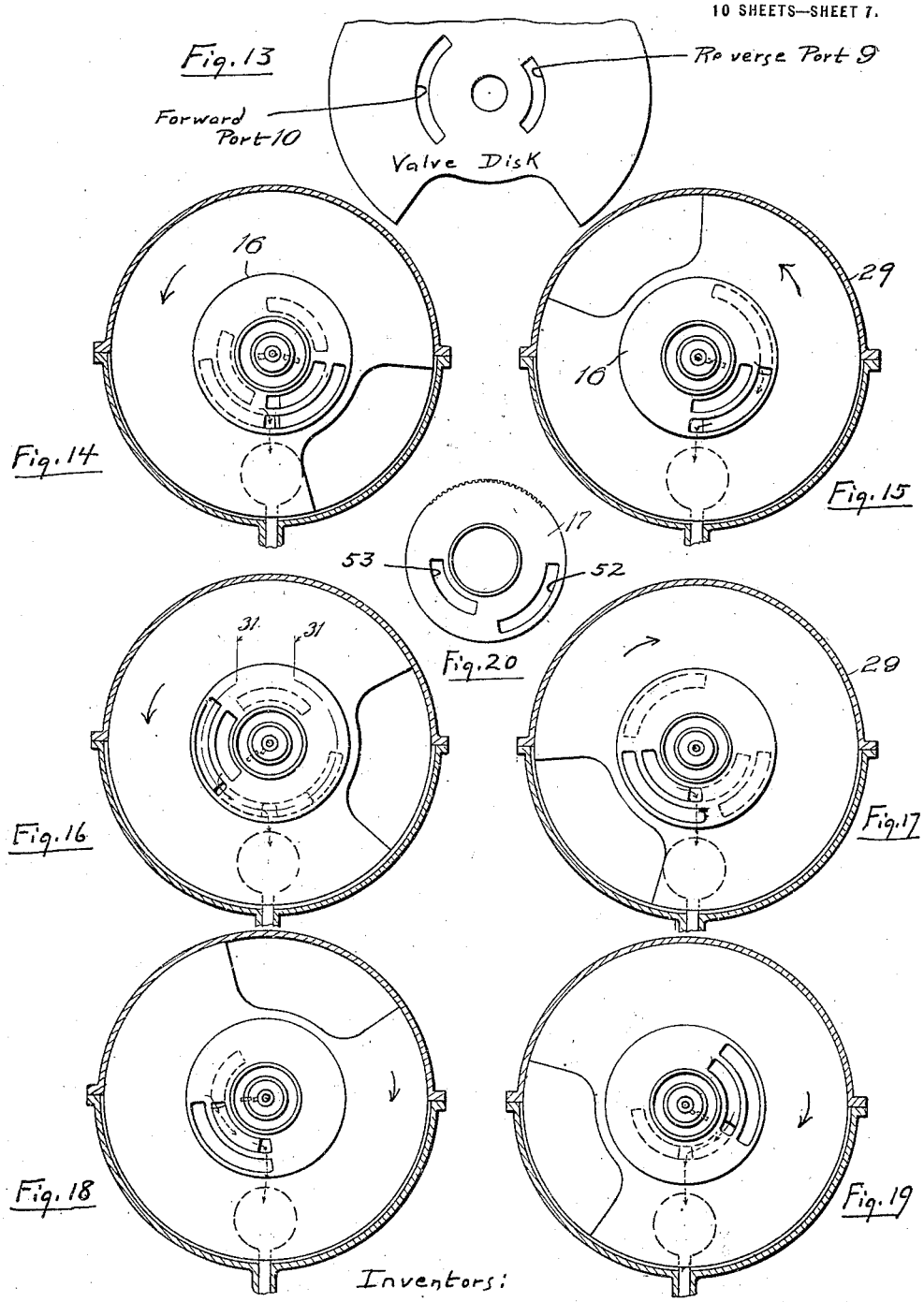

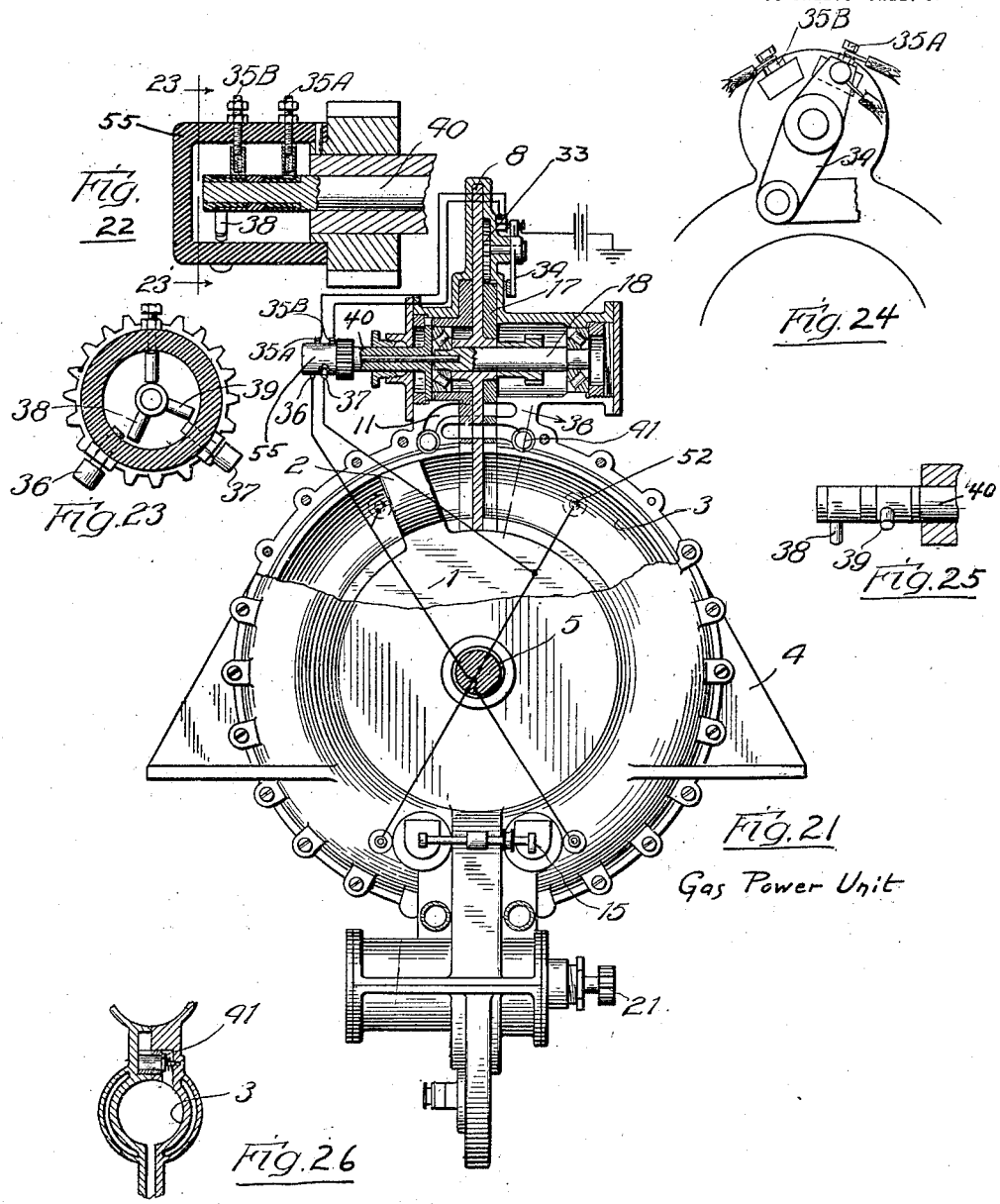

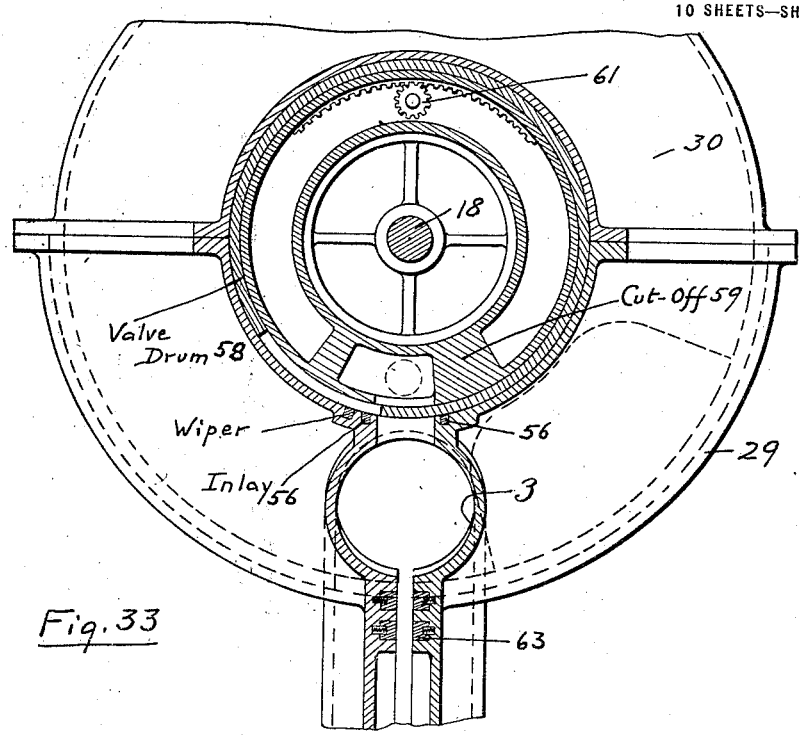
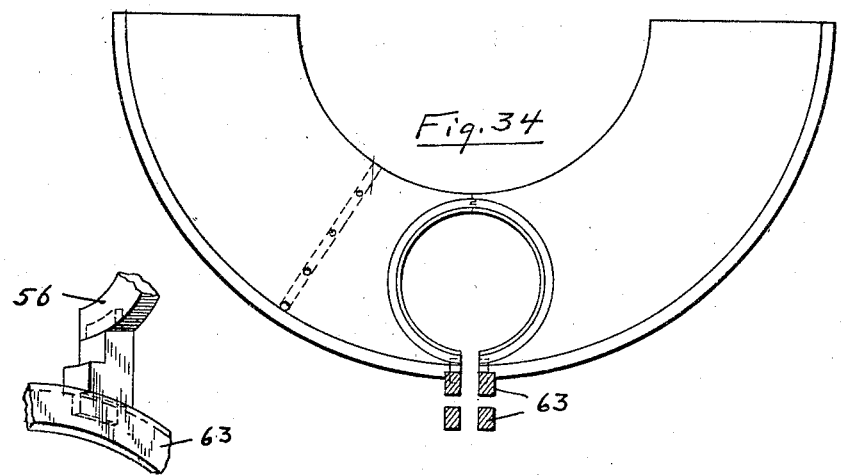

UNITED STATES PATENT OFFICE.

AUGUST J. HENIG AND JOHN E. TITUS, OF CHICAGO, ILLINOIS, ASSIGNORS, BY DIRECT AND MESNE ASSIGNMENTS, TO HENIG ENGINE CO., A CORPORATION OF ILLINOIS.

ROTARY ENGINE.

1,332,468.      Specification of Letters Patent.      Patented Mar. 2, 1920.

Application filed May 26, 1917. Serial No. 171.105.

*To all whom it may concern:*

Be it known that we, AUGUST J. HENIG and JOHN E. TITUS, both citizens of the United States, and both residing at Chicago, in the county of Cook and State of Illinois, have invented certain new and useful Improvements in Rotary Engines; and we do hereby declare the following to be a full, clear, and exact description of the invention, such as will enable others skilled in the art to which it appertains to make and use the same.

In its general aspects, our invention relates to rotary engines and aims to provide an unusually simple and highly efficient type of reversible engine in which the cut-off can readily be varied while the engine is running and in which both the clearance and the friction is reduced to a minimum. As embodied in an internal combustion engine, our invention also aims to provide simple and easily adjusted ignition-timing means definitely related to the valve mechanism. Our invention also aims to provide simple means for simultaneously and proportionally adjusting the cut-off for each of the respective piston-chambers of a multi-pistoned rotary engine. Still further objects will appear from the accompanying drawings and from the following specification, though we wish it understood that the engines as disclosed are merely illustrative of desirable types of an invention which would be susceptible also of other embodiments without departing from the spirit of the appended claims.

In the drawings,

Figure 1 is a side elevation of a duplex steam engine embodying our invention.

Fig. 2 is a transverse vertical section through one of the engine shafts, taken in the plane of the center of the power bore.

Fig. 3 is a plan view of a gas engine embodying our invention and comprising two power units and a compressor.

Fig. 4 is a side elevation of the same gas engine.

Fig. 5 (Sheet 1) is a detail showing the method of controlling one of the exhaust ports of the steam or gas engine.

Fig. 6 is an elevation of the compressor end of the gas engine of Figs. 3 and 4, taken from the line 6—6 of Fig. 4.

Fig. 7 is an elevation of one of the power units of the steam engine of Fig. 1, taken from the line 7—7.

Fig. 8 is a side elevation of the compressor of the gas engine of Figs. 3, 4 and 6, partly in section.

Fig. 9 is a front elevation of the gas engine, taken from the right hand end of Fig. 4 and partly in section.

Fig. 10 is a fragmentary section through Fig. 8, along the line 10—10.

Fig. 11 is a face view of the compressor valve of Fig. 8.

Fig. 12 is an enlarged detail of a pair of the check valves of Fig. 9.

Fig. 13 is a fragmentary face view of one of the valve disks, showing the ports and inlays surrounding the ports.

Fig. 14 is a section through one of the valve chambers, taken at the instant of initial inlet with the parts arranged for forward movement at maximum time of admission, or in position for starting the engine.

Fig. 15 is a similar section showing the position of the valve disk immediately before shutting off the admission.

Fig. 16 is a section at the cut-off point and with the cut-off disk shifted to provide a short cut-off, this being the normal running position.

Fig. 17 is a similar section with the parts arranged for starting in reverse direction with a late cut-off.

Fig. 18 is a section with the parts arranged for reverse driving as in Fig. 17, but taken at the point of cut-off.

Fig. 19 is a section similar to Fig. 18, but with the cut-off disk set for an early cut-off.

Fig. 20 is a face view of the cut-off disk.

Fig. 21 is an elevation of one of the gas power units, partly in section, taken from the line 21 of Fig. 4.

Fig. 22 is a central longitudinal section through the timer of the gas engine.

Fig. 23 is a transverse section through the timer of Fig. 22.

Fig. 24 is an enlarged detail view showing the reversing connection on the timer.

Fig. 25 is a fragmentary elevation of the timer shaft and of the bearing for the same.

Fig. 26 is a fragmentary transverse section through the power bore of the engine unit of Fig. 21, showing the inlet check valve.

Fig. 31 (Sheet 2) is a developed diagram showing the positions of the cut-off, valve and reversing disks of a steam or gas engine unit, taken at point of inlet, with the valves set for a short cut-off, this diagram being developed from the line 31 of Fig. 16.

Fig. 33 is a detail view showing the method of packing the valve drums.

Fig 34 is a detail elevation of one of the facings of the valve pocket of Fig. 33.

Fig. 35 is a perspective view showing the connection between the packing rings for the power bore and the slot in which the piston disk travels.

Figure 27:
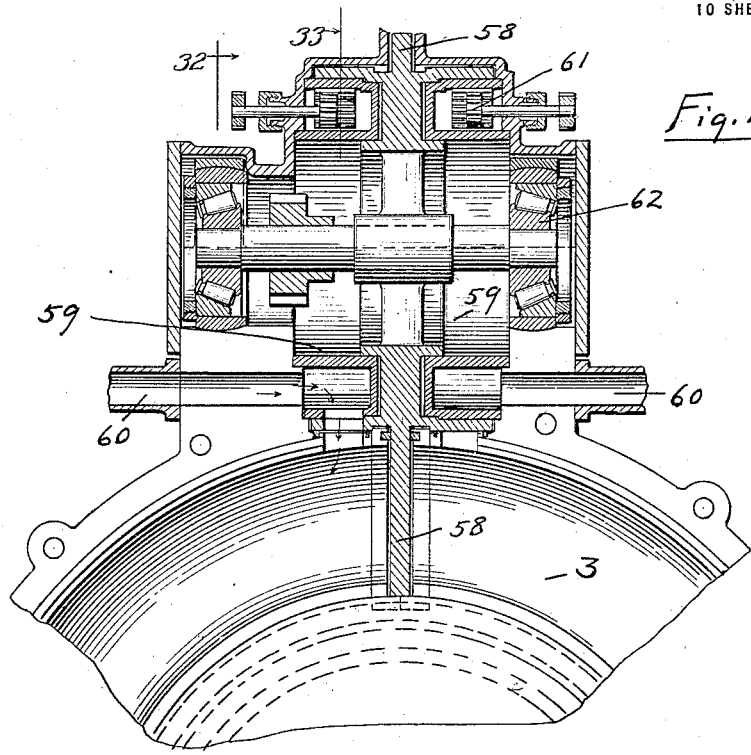
Fig. 27 is a fragmentary and enlarged transverse section through a steam power unit equipped with a simplified valve construction.

In the copending application of August J. Henig, filed Jan'y. 2, 1917 as Serial No. 140070, one of the applicants has disclosed a rotary engine using a continuously rotating and peripherally recessed valve disk for controlling the admission of the actuating fluid to the raceway or power bore of the engine. Our present invention, in certain of its aspects, aims to improve on this construction by providing means coöperating with such valve disks for adjusting the cut-off of the actuating fluid and for stopping and reversing the engine, also for simultaneously controlling the coöperating means thus associated with the numerous valves of an engine employing a number of pistons. For example, Figs. 1 and 2 show a steam engine comprising two units, each having a single piston disk 1 carrying two opposed pistons 2, which opposed pistons travel continuously in an annular single runway or power bore 3 formed in the body 4 of one unit of the engine. Each of the said power bores is equipped at points diametrically opposite the shaft 5 of the engine with two pairs of exhaust ports 6, each pair being disposed at opposite sides of two transverse passages in the power bore, in each of which passages a valve disk 8 rotates continuously. This valve disk has a peripheral portion cut away after the manner of Fig. 13, thereby permitting one of the pistons to pass the disk while the peripheral recess is in alinement with the power bore intercepted by this disk. Each of the exhaust ports is normally held closed by a spring (Fig. 5) but arranged to be opened by a cam 27 as hereafter described; that is to say one of each of these pairs of exhaust ports is continuously held open when the engine is to run in one direction, and the other pair when the engine is run in the opposite direction.

Each disk 8 also has a pair of arcuate slots 9 and 10 disposed at unequal distances from the axis of the disk. For the intake of the engine, we provide a pair of inlets 11 and 12 both continuously connected to the supply of steam and connected respectively to ports in the power bore 3 at opposite sides of the valve disk 8 by passages 13 and 14, both of which passages are intercepted by the body of the disk 8 during the greater part of each revolution of the latter.

Whenever the radially outer slot 10 alines with the inlet 11 and the passage 13 leading therefrom to the bore 3 of the engine, fluid is admitted to this bore, thereby introducing pressure between the adjacent piston and the disk 8 for moving the piston forward. Likewise, the inner slot 9 temporarily connects the reverse inlet 12 with the passage 14 for admitting the actuating fluid to the bore 3 for moving the piston in the opposite direction.

To facilitate a reversing of the engine without requiring a separate control for the inlets 11 and 12, we preferably interpose between the valve disk 8 and the casing portions adjacent thereto a reversing disk 17 mounted coaxially with the valve disk 8 and adapted to be rotationally shifted by means of a reversing lever 51 connected to a pinion 33 meshing with teeth on a portion of the periphery of the disk 17. The latter disk has two ports disposed at different distances from its axis and out of alinement radially of the disk, and desirably in the shape of arcs of equal angular extension, as shown in Fig. 20. If the engine is to run in a counter-clockwise direction when viewed as in Fig. 2, this disk 17 is set so that the radially outer port 52 alines with the inlet passage 13 of the engine, while the radially inner port 53 is out of alinement with the other inlet passage 14. To reverse the engine, the disk 17 is shifted by means of the lever 51 until it brings the port 53 into alinement with the passage 14 and simultaneously brings the port 52 out of alinement with the inlet passage 13. Consequently, the steam will be admitted to the power bore either on one side or on the other side of the valve disk, according to the position of the disk 17; hence the engine can readily be reversed by merely moving the lever 51 without changing any other connections, or can be stopped by moving the disk 17 to the intermediate position in which both of the passages 13 and 14 aline with the solid portion of the disk 17 disposed radially between the nearer ends of the arcuate slots 52 and 53.

To work the steam expansively with various loads on the engine, we preferably control the proportion of the piston stroke during which steam is admitted behind the piston, by interposing a cut-off disk 16 between the valve disk 8 and the parts of the casing on the side opposite the reversing disk. This cut-off disk desirably has two arcuate slots of equal angularity disposed at different distances from the axis of the disk (as shown in Figs. 14 to 19) so as to aline respectively with the port 10 and passage 13, and with the port 9 and the passage 14, thereby enabling this disk to function equally well regardless of the direction in which the engine is operated. The cut-off member 16 is desirable coaxial with the valve disk 8, and is arranged for manual adjustment, as by a shaft 20 carrying transverse pins intermeshed with teeth on a drum integral with the disk 16 and shown at the right of the latter in Fig. 2. Assuming the reversing disk to be set for forward running, it will be obvious from the drawings that steam will be admitted (as shown by the arrow) from the time when the valve disk is in the position of Fig. 14 and until it passes the position of Fig. 15. Or, if the cut-off disk is shifted in position as in Fig. 16, the cut-off will be hastened, thus shortening the admission of the steam to the power bore. Likewise, with the reversing disk in its other operative position, steam will be admitted from the time the valve disk is in the position of Fig. 17 until it passes that of Fig. 18, or for a shorter period if the cut-off disk is shifted to the position of Fig. 19. The relative position of the three disks may be seen diagrammatically from Fig. 31, it being remembered that only the valve disk moves and that both of the other disks can be shifted in position with respect to the bore wall.

To simplify the controlling of a number of the reversing disks, we preferably shift all of the same by means of a single lever 51, which may be directly connected to one of these disks as in Fig. 2 and which may be connected to the other disks through any suitable means, such as the link chains 54 of Fig. 1. Likewise, we desirably interconnect the shafts 20 controlling the setting of the cut-off disks associated with the numerous power bore sections of the engine, as by providing racks 22 meshing with teeth 21 on the shafts 20, these racks being moved through a gear segment 23 on a lever 24, which lever is also connected by gearing and shafts 25 to similarly disposed racks controlling the cut-off disks in other parts of the engine.

For the exhaust of the engine, we preferably provide two exhaust ports 6 for the power bore at opposite sides of each valve disk, using one of the pair when the engine is running forward and the other when the engine is reversed. Each of these ports is preferably controlled by a spring-pressed valve 28 (Fig. 5) which normally holds the port closed, but which may be opened by a cam 27 mounted on a shaft also controlled by the link chains 54 or connections between the reversing disks. The pair of cams 27 associated with the ports 6 at opposite sides of each valve disk are angularly out of alinement with respect to the common shaft carrying the same, so that a rotational shifting of the shaft to open one of the valves 28 will close the other; hence, the movement of the single lever 51 to effect the forward or reverse admission of the steam will simultaneously control the exhaust ports 6 so as to open the proper ones; the active ports 6 being then continuously open so as to permit the previously active steam ahead of each piston to be pushed out by the latter, and so as to exhaust part of the previously active steam behind each piston as soon as the latter passes the exhaust port.

In applying our invention to internal combustion engines, the adjustable parts may be similarly controlled, as shown in Figs. 3 and 4, and the connections from the reversing lever 51 to the various reversing disks can also include connections for reversing the intake and outlet of the compressor shown at the right hand end of Fig. 4. To make the reversing mechanism entirely self-contained and operable by a single lever, we preferably also include means for shifting the ignition connections to and from spark plugs 52 disposed respectively at opposite sides of each valve disk. We also preferably provide means for varying the time of ignition automatically according to the position of the cut-off disk. With these purposes in mind, we desirably fasten a contact lever 34 (Figs. 21 and 24) to the shaft of the pinion 33 which meshes with the reversing disk, so that a shifting of this disk automatically shifts the electrical circuit connections between contact members $35^A$ and $35^B$ respectively connected electrically to relatively insulated metal rings on the timer shaft 40 (Fig. 22). These rings respectively carry contact pins 39 and 38 (Fig. 25) arranged for temporarily closing the ignition circuit respectively through a terminal 36 when the engine is running forward, or a terminal 37 when the engine is reversed. The shaft 40 of the timer is fast upon the shaft 18 of the valve disk so as to rotate with the latter, while the terminals 35ᴬ, 35ᴮ, 36 and 37 are all carried by an insulating shell 55 which is rotationally connected to the cut-off disk by a suitable spline (Fig. 21) so that the shifting of this disk will also vary the position of the shell 55 and the parts carried by the latter. The spline just mentioned permits the cut-off disk to move longitudinally of its axis independently of the shell 55 or the shaft 40, thus allowing such adjustments (not here shown) as may be desirable for reducing the clearance between the three disks. To prevent the exploded gaseous mixture from being forced back into the compressor by its own pressure, we provide spring-pressed check valves 41 at the inlets to the power bore, as shown in Figs. 21 and 26.

Figures 28, 29, 30:
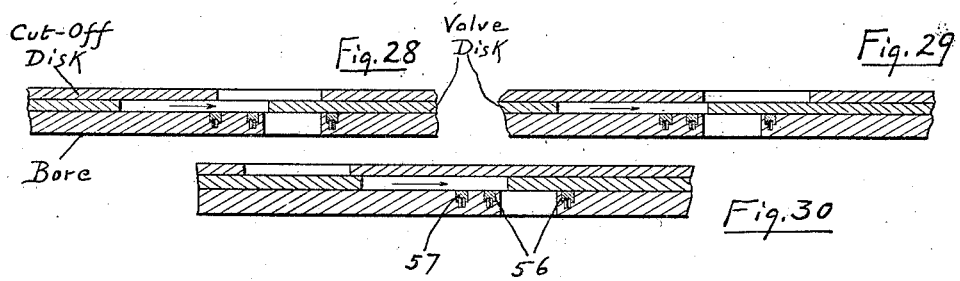
Fig. 28 is a developed diagram showing the positions of the cut-off and valve disks of Fig. 27 in relation to the inlet port of a power bore, with the valve adjusted for a short intake, corresponding to an ordinary running position.
Figs. 29 and 30 are similar diagrams, showing the parts respectively adjusted for a maximum intake and for a neutral or stopping position.
Figure 32:
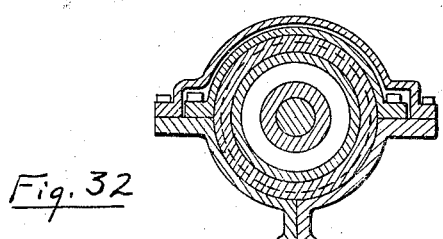
Fig. 32 is a transverse section through the valve casing of Fig. 27, taken through the inlet port.

We also desirably provide the body of the engine with spring-pressed inlays 56 bearing against the valve disk and avoiding a leakage alongside the latter without introducing the friction which would be involved by having this disk bear throughout its face against adjacent parts. These inlays are desirably at opposite sides of the ports (as in Fig. 30) and are desirably supplemented by oil wipers 57. However, while we have pictured and described the rotary engine of our invention as including disks or rotationally movable members bearing against each other in a direction longitudinal of their shafts, we do not wish to be limited to these or other details of the construction and arrangement here disclosed, since many modifications might be made without departing from the spirit of our invention. For example, Fig. 27 shows part of a simplified valve construction for a steam engine, including a rotating disk member 58 disposed between a pair of cut-off drums 59, the latter being arranged respectively for use when running the engine forward and backward. Each drum 59 has a peripheral port adapted to aline with an inlet port of the engine, so as to form an unusually short passage from the inlet pipe 60 to the power bore 3. In this embodiment the two cut-off drums 59 associated respectively with the inlets for the forward and backward running of the engine are separately shifted by pinions 61. Fig. 27 also shows these pinions as engaging relatively longer teeth on the drums 59, thereby permitting the self-alining roller bearings 62 to be adjusted without disturbing the valve-controlling pinions. To pack the valve drums, we also preferably provide inlays 56 as in Fig. 33, while the piston disk is similarly packed by the packing rings 63 as shown in Figs. 33 and 34. One of these rings may desirably be united to one of the inlay rings for the drum valve members, as shown in Fig. 35. With this construction, it will be obvious from Fig. 33 that the length of intake will depend on the position of the cut-off drum 59 with respect to the inlet to the power bore, as graphically shown also in Figs. 28, 29 and 30. Other desirable details will appear from Fig. 10, showing the intake and outlet passages on the compressor of the gas engine unit, Fig. 12 showing the intake and outlet checks connecting these passages with the power bore, and Fig. 9 showing a pump having a plunger 43 operated by an eccentric strap on an eccentric which in itself is adjustable (by a lever 44) on the common shaft of the valve disk and the eccentric.

We claim as our invention:

1. In an engine, the combination with a casing having an annular piston chamber, and a continuously rotating disk transverse of and intermittently intercepting the chamber to form a head therefor; said element being equipped with a perforation forming a portion of the fluid supply passage for said chamber, of adjustably positioned means adjacent to said element and coöperating with the perforation in the latter to control the admission of fluid to said chamber.

2. An engine as per claim 1, in which the said adjustably positioned means include a member having a slot adapted to aline with the perforation in the rotating disk during a portion of each rotation of the latter, the ends of said slot defining the period during which fluid is admitted to said chamber.

3. An engine as per claim 1, in which the said adjustably positioned means include a member mounted coaxially with said rotating disk and having an arcuate slot adapted to aline with the perforation in the rotating element during a portion of each rotation of the latter.

4. An engine as per claim 1, in which the said adjustably positioned means include a member mounted coaxially with the said rotating disk and having an arcuate slot adapted to aline with the perforation in said rotating disk during a portion of each rotation of the latter; in combination with means for adjusting the said member about its axis with respect to said disk.

5. In a rotary engine having an annular piston chamber, a continuously rotating disk intermittently and transversely intercepting the chamber to divide the latter into stationary sections, the disk having a perforation, and a fluid supply passage having alined sections disposed on opposite sides of the disk and alining with the said perforation during a part of each rotation of the disk.

6. In a rotary engine, a casing having an annular piston chamber, a piston traveling continuously in said chamber, peripherally recessed and arcuately perforated disks positioned for intermittently and transversely intercepting said chamber to divide the latter ter into stationary sections, means connecting the piston with the disks for causing the movement of the piston continuously to rotate the disks, and means for supplying fluid under pressure to the section of the chamber through the arcuate perforations in the respective disk, and means for controlling the fraction of each rotation of the disks during which fluid is supplied through the arcuate perforations therein.

7. In a rotary engine, a casing having an annular piston chamber, a continuously rotating disk intermittently and transversely intercepting the chamber to subdivide the latter, the said disk having a peripheral recess and an arcuate slot out of alinement with the recess radially of the disk, and means for supplying fluid through the said slot to the piston chamber; and means for controlling the time at which the fluid passes through the slot, with respect to the position of the piston.

8. In a rotary engine, a casing having an annular piston chamber, and a continuously rotating disk intermittently and transversely intercepting the chamber to subdivide the latter, the disk having a peripheral recess and a pair of arcuate slots and means controlled respectively by the said slots for supplying actuating fluid to the piston chamber respectively at opposite sides of the disk.

9. In a rotary engine, a casing having an annular piston chamber, and a continuously rotating disk intermittently intercepting the chamber to subdivide the latter, said disk having a peripheral recess and a pair of arcuate slots both out of alinement with the recess radially of the disk, the arcuate slots being positioned at different distances from the axis of the disk.

10. A rotary engine as per claim 7, in combination with a normally stationary disk having an arcuate slot adapted to aline with the slot in the rotating disk during a portion of each rotation of the latter.

11. A rotary engine as per claim 8, in combination with a normally stationary disk having two arcuate slots each adapted to aline with one of the slots in the rotating disk during a portion of every rotation of the latter.

12. A rotary engine as per claim 8, in combination with a normally stationary disk having two arcuate slots substantially in alinement radially of the disk, each of the said slots being adapted to aline with one of the slots in the rotating disk during a portion of every rotation of the latter.

13. A rotary engine as per claim 8, in combination with a normally stationary disk having two arcuate slots substantially in alinement radially of the disk, each of the said slots being adapted to aline with one of the slots in the rotating disk during a portion of every rotation of the latter, the slots in the rotating disk being out of alinement with each other radially of the said disk.

14. An engine as per claim 7, in combination with two elements adjustably positioned respectively at opposite sides of said disk and equipped with slots adapted to aline with the said slot in the disk during a portion of each revolution of the latter.

15. In a rotary engine, a casing having an annular piston chamber, a continuously rotating disk intermittently and transversely intercepting the chamber to subdivide the latter, the disk having a peripheral slot and an arcuate slot, in combination with two elements adjustably positioned at opposite sides of the said disk and equipped with slots adapted to aline with the slot in the disk during a portion of each revolution of the latter, and separate means for adjusting the positions of the said two elements with respect to the said disks.

16. In a rotary engine, a casing having an annular piston chamber, a plurality of continuously rotating incomplete disks intermittently intercepting the chamber to divide the latter into sections each disk having an arcuate slot adapted to form part of the supply passage for one of said sections, normally stationary control elements adjacent respectively to said disks and each equipped with a slot adapted to aline with the slot in the adjacent disk during part of each revolution of the latter, and common means for adjusting the position of all of the said control elements.

17. In a rotary engine, a casing having an annular piston chamber, a plurality of continuously rotating incomplete disks intermittently intercepting the chamber to divide the latter into sections, each disk having an arcuate slot adapted to form part of the supply passage for one of said sections, normally stationary control elements adjacent respectively to said disks and each equipped with a slot adapted to aline with the slot in the adjacent disk during part of each revolution of the latter, said control elements being in pairs disposed respectively at opposite sides of the disks.

18. An engine as per claim 17 in combination with common means for respectively adjusting the position of all of the control elements at one side of the disks, and all of the control elements at the other side of the disks.

19. In an engine, a housing equipped with a piston chamber and a fluid supply passage for the same, a continuously rotating member equipped with a perforation intermittently forming part of said passage, a pair of normally stationary and independently adjustable control elements disposed respectively at opposite sides of said member and each equipped with a perforation coacting with the aforesaid perforation in intermittently forming part of the said fluid supply passage.

20. In an engine, a plurality of housings each having an annular piston chamber and a fluid supply passage for the same, continuously rotating members intermittently and transversely intercepting the respective chambers and the fluid supply passages for the latter, control means associated with the respective rotating members for controlling the interception of the respective fluid supply passages by the latter, and common means for varying the position of all of said control means.

21. In an engine, a plurality of housings each having a piston chamber and a fluid supply passage for the same, continuously rotating members intermittently intercepting the respective chambers and the fluid supply passages for the latter, control means arranged in pairs disposed respectively at opposite sides of the rotating members, each pair jointly controlling the intercepting of the respective fluid supply passages by the adjacent rotating member.

22. Engine construction as per claim 21, in combination with separate means each arranged for simultaneously shifting the position of one each of said pairs of control means.

23. In an internal combustion engine, a housing having a piston chamber and a fluid supply passage for the same, a continuously rotating member intermittently intercepting said passage, a control element associated with said member and equipped with a perforation forming part of the fluid supply passage, ignition means including a timer, and common means for adjusting the position of the timer and the control element.

24. In a rotary engine, a casing having an annular piston chamber, a continuously rotating disk intermittently intercepting the latter to divide the chamber into compartments, adjustable cut-off control means associated with said disk, and current supply means connected to said disk and responsive in time to the adjustment of the cut-off control means.

Signed at Chicago, Illinois, May 18th, 1917.

AUGUST J. HENIG.
JOHN E. TITUS.